United States Patent [19]

Gervais

[11] Patent Number: 5,508,719
[45] Date of Patent: Apr. 16, 1996

[54] PRESSURE-ACTUATED POINTING DEVICE

[75] Inventor: Jean-Philippe A. F. M. Gervais, London, United Kingdom

[73] Assignee: AST Research, Inc., Irvine, Calif.

[21] Appl. No.: 877,887

[22] Filed: May 1, 1992

[51] Int. Cl.$^6$ ................................................ G09G 3/02
[52] U.S. Cl. .................................. 345/157; 345/168
[58] Field of Search ................................ 340/706, 709, 340/711; 341/20, 21; 345/156, 157, 160, 161, 168, 173, 174, 175, 177; 178/18, 19

[56] References Cited

U.S. PATENT DOCUMENTS

| | | | |
|---|---|---|---|
| 4,313,113 | 1/1982 | Thornburg | 340/709 |
| 4,435,616 | 3/1984 | Kley | 178/18 |
| 4,680,577 | 7/1987 | Straayer et al. | 340/711 |
| 4,736,191 | 4/1988 | Matzke et al. | 340/20 |
| 4,739,128 | 4/1988 | Grisham | 340/709 |
| 4,782,328 | 11/1988 | Denlinger | 345/175 |
| 4,812,833 | 3/1989 | Shimauchi . | |
| 4,853,630 | 8/1989 | Houston | 340/709 |
| 4,879,556 | 11/1989 | Duimel | 340/709 |
| 4,992,631 | 2/1991 | Gee . | |
| 5,065,146 | 11/1991 | Garrett . | |
| 5,119,078 | 6/1992 | Grant | 341/22 |

OTHER PUBLICATIONS

Howard, Bill, "Field Mice: Different, yes. Better, maybe," *PC Magazine*, Vo. 10, No. 17, pp. 111–112, 123–126, 133 (Oct. 15, 1991).

"Hot PC Products", *Electronic Design*, vol. 38, No., 11, p. 22 (Jun. 14, 1990).

Reinhardt, Andrew, "Touch–and–Feel Interfaces", *BYTE*, pp. 223–226 (Feb. 1991).

IBM Technical Disclosure Bulletin, vol. 15, No. 1 (Jun. 1972).

The Home Row Pointing Device brochure, Clackamas, Oregon (Mar. 1990).

*Primary Examiner*—Tommy P. Chin
*Assistant Examiner*—Gin Goon
*Attorney, Agent, or Firm*—Knobbe, Martens, Olson & Bear

[57] ABSTRACT

A pressure-actuated pointing device (PAPD), especially adapted for application in a personal, laptop, or notebook computer, is finger-activated and is used to control the displacement of a cursor on a graphics screen. The PAPD includes at least one rigid finger pad rigidly mounted to and supported by a flexible stem. The stem, in turn, is rigidly mounted to a base plate with the finger pad positioned flush with a forward-facing surface of a computer enclosure. A system operator applies pressure to the finger pad in order to displace the cursor on the graphics screen. The magnitude of the applied positive pressure gradient and point of pressure application on the finger pad determine the magnitude and direction of the cursor's displacement on the graphics screen.

22 Claims, 5 Drawing Sheets

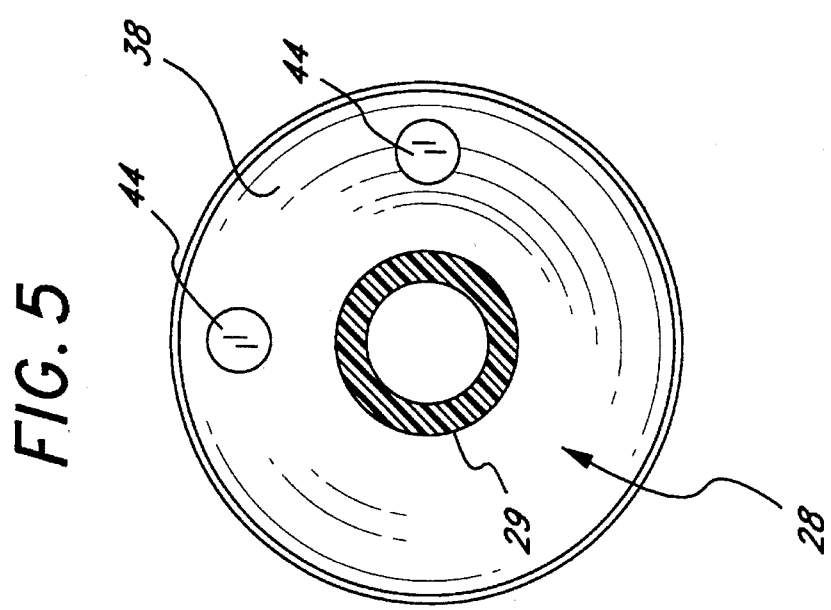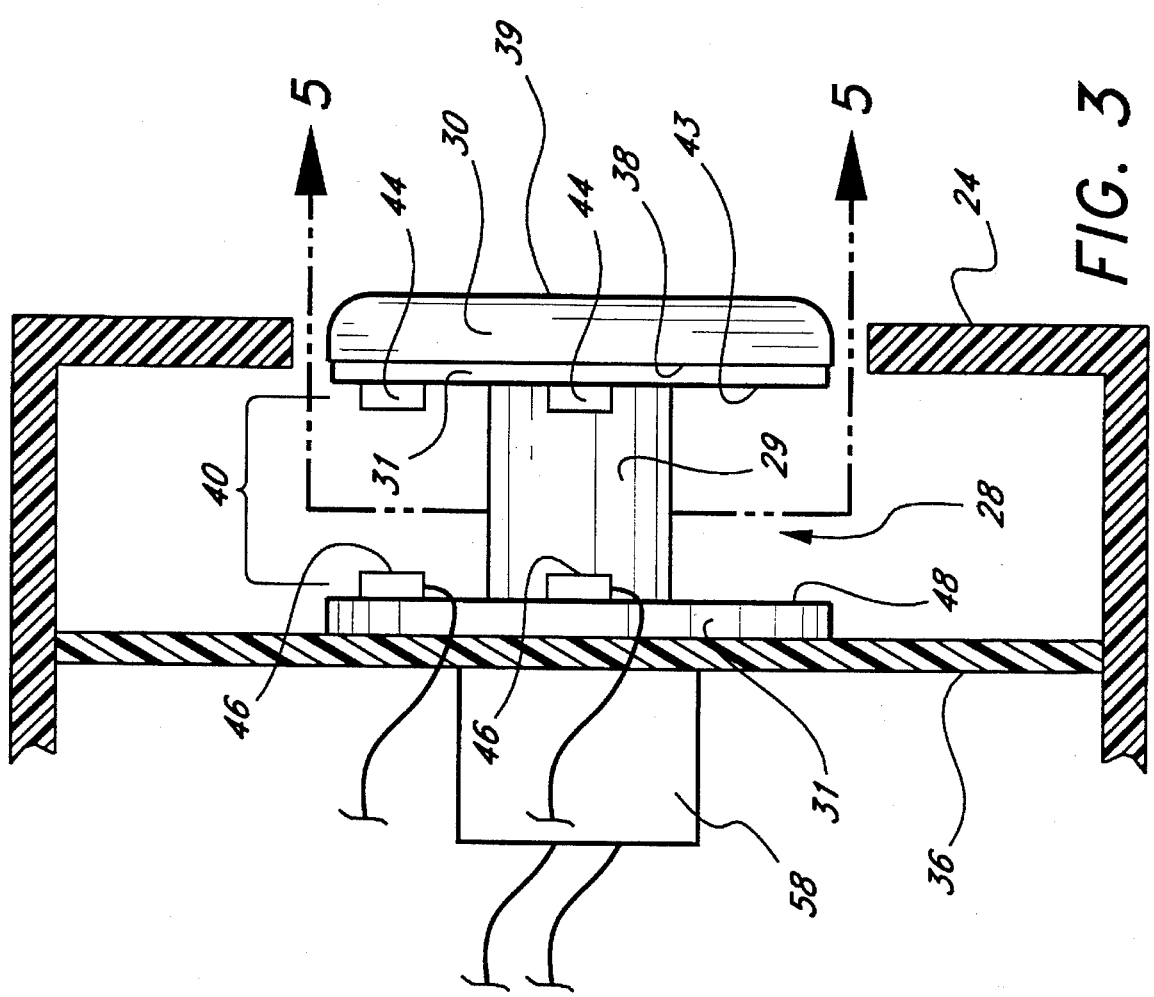

PRESSURE-ACTUATED POINTING DEVICE

BACKGROUND OF THE INVENTION

1. Field of the Invention

The present invention generally relates to personal computers, and more particularly to a pointing device system used in conjunction with portable, laptop or notebook computers.

2. Description of Related Art

Pointing devices are commonly used in conjunction with a computer in order to control the movement of a cursor on a graphics screen. Conventional devices employed for this function are arrow keys on a computer keyboard and computer "mice." Arrow keys typically consist of four adjacent bipolar keys, which move the cursor up, down, left, or right upon depression of a respective key. Such keys are commonly used for editing simple textual applications. However, because the keys must be used sequentially and limit the cursor to orthogonal directions of displacement, arrow keys are impractical to use in many more sophisticated graphical applications.

Computer mice employ mechanical, optical, or other means to control the displacement of a cursor on a graphics screen. The mouse is moved over a flat surface in proportion to the desired motion of the cursor on the graphics screen. While providing the computer user with considerable flexibility over the motion of the cursor on the graphics screen, a computer mouse requires an auxiliary flat surface proximate to the computer keyboard.

With the introduction of small laptop and notebook computers, flexible built-in pointing devices became necessary. Somewhat smaller, more efficient, and more ergonomic devices have been developed that combine the cursor control flexibility of a mouse with the integral keyboard mounting of arrow keys. A variety of these state-of-the-art devices are described in the February 1991 issue of BYTE magazine in an article entitled "Touch-and-Feel Interfaces: Built-In Pointing Devices Replace Mice in Notebooks and Laptops." The devices discussed in this article include trackballs, touchpads, touchscreens, isopoints, and home row keys.

A trackball consists of an upwardly-facing sphere mounted in a specially-designed base that allows the sphere to be freely rotated in any desired direction at any desired velocity. The cursor on the graphics screen is displaced in proportion to the speed and direction at which the sphere is rotated. While trackballs are compact, they require considerable finger movement to produce large cursor displacements at low velocities. In addition, because it is difficult for a system operator to successively rotate the sphere in a constant direction, linearly displacing the cursor on the graphics screen can prove troublesome. Finally, trackballs are not suited for operation in dirty environments because any foreign material deposited on the surface of the sphere can quickly contaminate the internal workings of the unit and thereby impede its operation.

A touchpad consists of an auxiliary rectangular pad whose surface is mapped to correspond to the graphics screen. By touching a location on the touchpad, the computer user directs the computer to move the cursor to the corresponding location on the graphics screen. Touchpads require the computer user to move his/her hand from the keyboard to the touchpad surface in order to displace the cursor on the graphics screen. In addition, because the typical touchpad is considerably smaller than the graphics screen, accurate positioning of the cursor on the graphics screen can prove troublesome. Finally, touchpads only provide control over the cursor's absolute position and do not permit the computer user to direct the cursor's speed or path as it moves from its original to its final position.

A touchscreen is similar to a touchpad except that the system operator interfaces directly with the graphics display by touching the graphics display at a desired location. As with a touchpad, a touchscreen requires the computer user to move his/her hand from the keyboard to the graphics screen in order to displace the cursor. Similarly, touchscreens only provide control over the cursor's absolute position and do not permit the computer user to direct the cursor's speed or path as it moves from its original to its final position.

An isopoint consists of a cylindrical bar that both slides along and revolves about its central axis. The isopoint is typically located on the upwardly-facing surface of the keyboard proximate to the space bar. The computer user slides or revolves the isopoint to generate horizontal or vertical displacement of the cursor on the graphics screen, respectively. As with trackballs, isopoints require considerable finger movement to produce large cursor displacements at low velocities. In addition, a computer user must simultaneously revolve and slide the cylindrical bar to achieve a diagonal displacement of the cursor on the graphics screen, an unnatural and cumbersome operation. Finally, isopoints are not suited for operation in dirty environments because any foreign material deposited on the surface of the cylindrical bar can quickly contaminate the internal workings of the unit and thereby impede its operation.

A home row key consists of a joystick-like mechanism incorporated into a standard keyboard key. Under normal operation, the key simply functions as a bipolar switch to input a particular character. When used in conjunction with another key (such as the CTRL or ALT key), however, the home row key functions as a joystick to displace the cursor on the graphics screen. The displacement of the cursor is governed by the direction in which the key is moved relative to its neutral position and the duration for which the key is held in the non-neutral position. The home row key includes a force sensing mechanism which senses the force and the direction of the applied force. The cursor, in turn, proportionally responds to a force applied.

The home row key has a number of ergonomic disadvantages. Significantly, the home row key necessarily requires the computer user to simultaneously operate two separate keys, an awkward operation. If the user does not correctly enter the key combination, the user will input alpha-numeric characters rather than control the cursor. The user must then delete the characters and then retry the key combination to control the cursor. In addition, because the cursor moves as a function of duration rather than displacement, the computer user cannot quickly move the cursor from one side of the graphics screen to the other. An additional key can be used in conjunction with an home row key to accelerate the cursor's displacement on the graphics screen. However, the use of such a key further complicates the operation of the home row key, requiring yet a third key for the computer user to manipulate. Furthermore, accelerator keys typically increase the speed of the cursor motion incrementally, rather than continuously, limiting the computer user's control over the cursor's displacement.

Moreover, precise positioning of the cursor is difficult because the cursor responds to any application of force applied. That is, the cursor responds to the application of a constant force, of an increasing force and of a decreasing force. Thus, in order to home in on a particular target on the graphic screen, the user must control both the acceleration (resulting from a positive force gradient applied to the home row key) and the deceleration (resulting from a negative force gradient applied to the home row key) of the cursor. Consequently, some users find such a system difficult to operate and constantly "over shoot" a desired target location on the graphic screen.

Furthermore, the small top surface area of the home row key, typically about one square centimeter, provides little tactile feedback with regard to the direction imposed on the cursor. Finally, the home row key requires its own software driver to interface with graphic environments or other application software systems.

SUMMARY OF THE INVENTION

The present pressure-actuated pointing device ("PAPD") overcomes many of the disadvantages of the prior pointing devices. The PAPD is a finger-activated cursor control system for use with a personal computer to control a cursor on a computer graphic screen. The PAPD comprises a finger pad and a pressure-sensing means for resolving the level of pressure applied to the finger pad and generating an output signal proportional to the applied pressure. The output signal controls the magnitude of displacement of the cursor on the graphic screen and is proportional to the positive gradient of the pressure applied to the finger pad. The term "gradient" is hereinafter defined to mean the first derivative of the pressure applied as a function of time.

In a preferred embodiment, the PAPD is integrally-mounted on a forward-facing surface of the computer. This ergonomic positioning of the PAPD takes advantage of the natural position of the system operator's thumbs, which are normally on or very near the keyboard forward-facing surface while using the computer. The PAPD therefore does not require an auxiliary pad proximate to the computer keyboard, nor does it necessitate that the system operator remove his/her hand(s) from the keyboard in order to displace the cursor on the graphics screen.

The PAPD includes a flexible stem supporting the finger pad and a pressure sensing device which resolves movement of the stem caused by the applied pressure into a voltage output. The pressure sensing device preferably comprises a plurality of hall effect transducers or a plurality of strain sensing transducers. The PAPD senses pressure gradients and generates an output signal proportional to the positive changes in the applied pressure. The output signal transmitted to a mouse driver results in cursor movement, either as discrete increments of displacement or as continuous displacement on the graphic screen. Advantageously, the output signal is compatible with that provided by a conventional graphical input device.

The pressure-sensing means of the PAPD preferably also detects a pressure application point of the applied pressure and generates an output signal corresponding to a vector defined between a reference point at the center of the finger pad and the pressure application point. This output signal controls the direction of displacement of the cursor on the graphic screen. Again, the pressure-sensing means preferably comprises a plurality of hall effect transducers or a plurality of strain sensing transducers.

The PAPD allows the system operator to control not only the cursor's final position on the graphics screen but also the path that the cursor follows as it moves from its original to its final position. In addition, because the PAPD controls the magnitude of the cursor's displacement based on the magnitude of the pressure applied to the finger pad, the system operator can quickly move the cursor from one side of the graphics screen to the other by quickly applying a large amount of pressure to the finger pad.

In accordance with another aspect of the present invention, there is provided a personal computer comprising a graphic screen displaying a cursor, a keyboard including an upward-facing surface and a forward-facing surface. The personal computer also includes a cursor control system having a finger-actuated input mechanism mounted on the forward-facing surface of the keyboard. The finger-activated input mechanism comprises a finger pad and a pressure-sensing means for generating an output signal to control the cursor.

In accordance with a preferred method for controlling the movement of a cursor on a graphics screen, pressure is applied to a finger pad and the amount of the positive pressure gradient applied is resolved into a magnitude component. An output signal is generated proportional to the magnitude component corresponding to the applied positive pressure gradient which is used to control the displacement of the cursor on the graphics screen.

In a preferred method, the applied positive pressure gradient is also resolved into a directional component. An output signal is generated corresponding to the direction component and is used to control the direction of displacement of the cursor on the graphic screen.

BRIEF DESCRIPTION OF THE DRAWINGS

These and other features of the invention will now be described with reference to drawings of the preferred embodiments that are intended to illustrate and not to limit the invention, and in which:

FIG. 3 is a partial cross-sectional view taken along line 3—3 of FIG. 2 illustrating one preferred embodiment of a pressure sensing device with hall effect transducers;

FIG. 5 is a cross-sectional view taken along line 5—5 of FIG. 3;

DETAILED DESCRIPTION OF THE PREFERRED EMBODIMENTS

Figure 1:
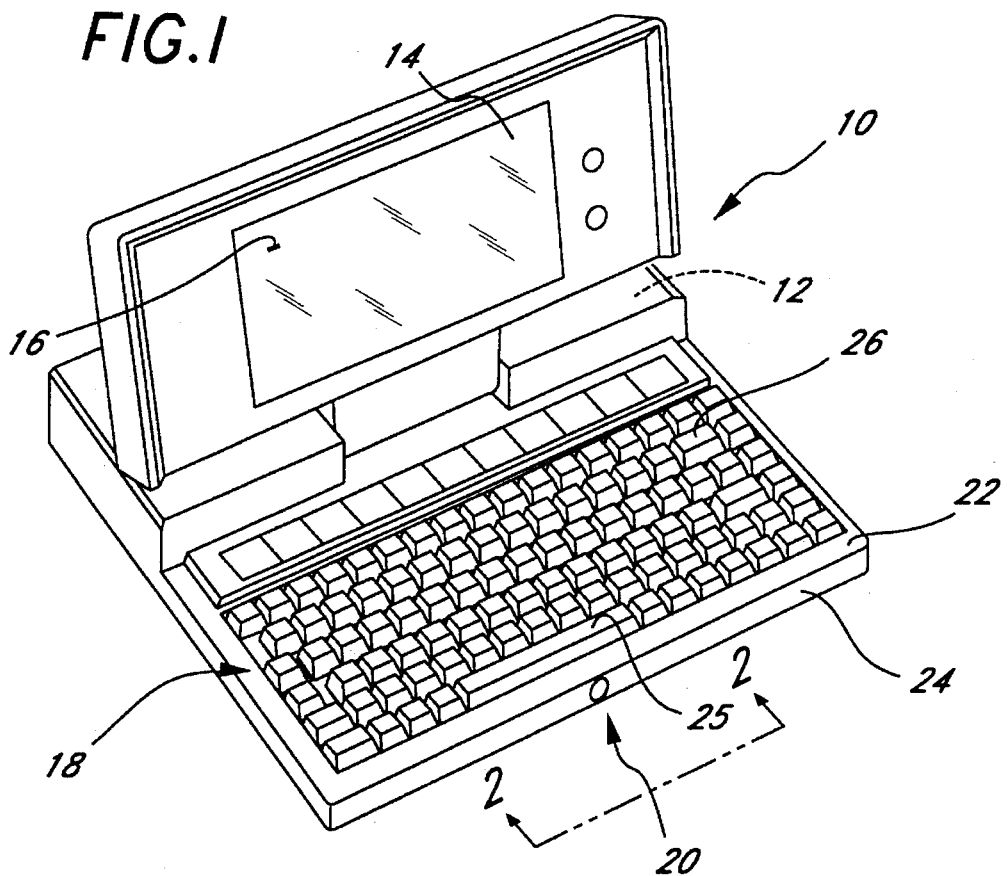
FIG. 1 is a perspective view of a personal computer incorporating the pressure actuated pointing device in accordance with one embodiment of the present invention.

Personal computers, such as the notebook variety 10 illustrated in FIG. 1, typically include an internal processing unit 12 (not shown), a graphics screen 14 displaying a cursor 16, and a keyboard 18. The cursor 16 is a specialized pointer, frequently either an arrow or an underscore, that allows the computer user to identify a particular point or area on the graphics screen 14. For graphics applications, such as computer-aided drafting, a set of cross hairs is also commonly used. In order for the computer user to manipulate the cursor 16 (or cross hairs) on the graphics screen 14, some form of cursor control system is required.

The present invention relates to such a cursor control system. In particular, the present invention is a finger-actuated pressure-actuated pointing device (PAPD) 20 used to control the displacement of a cursor 16 on a graphics screen 14. As used herein, "finger-actuated" means actuated by a finger or a thumb of a system operator. In addition, for the purposes of this application, cursor control and cross hair control are used interchangeably.

Figure 2:
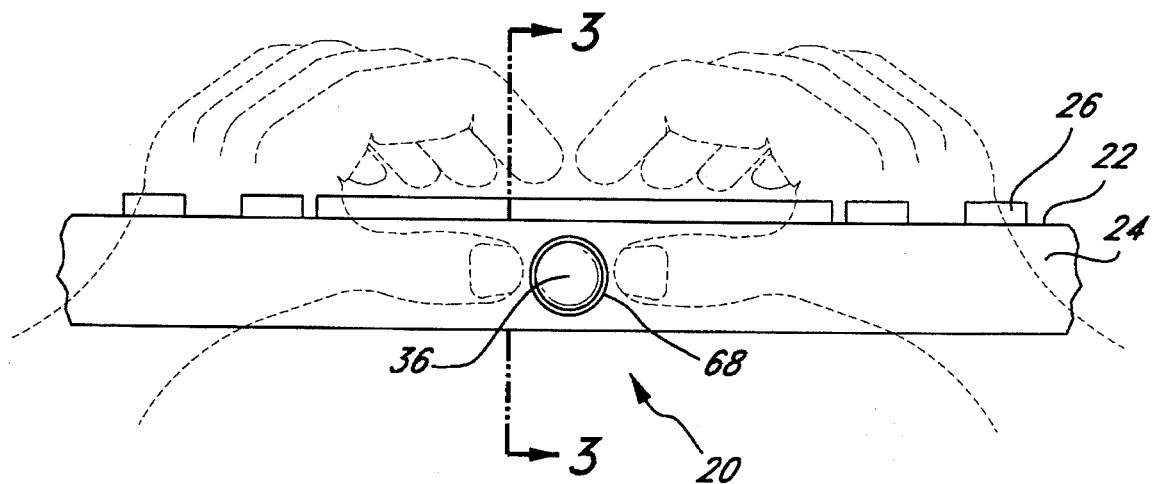
FIG. 2 is a partial front elevational view of the personal computer of FIG. 1.

FIGS. 1 and 2 illustrate a preferred embodiment of the pressure-actuated pointing device 20 integrally mounted into the personal computer 10. Referring to FIG. 1, the computer keyboard 18 has an upwardly-facing surface 22 and a forward-facing surface 24. A plurality of keys 26 are flexibly-mounted on the upwardly-facing surface 22 of the keyboard 18, allowing the system operator to input alphanumeric data into the computer 10. The pressure actuated pointing device 20 is mounted on the keyboard forward-facing surface 24.

This ergonomic positioning of the pressure-actuated pointing device 20 takes advantage of the natural position of the system operator's thumbs, which are normally on or very near the keyboard forward-facing surface 24 while using the computer 10 for ready access to the space bar 25. Furthermore, the compact shape of the pressure-actuated pointing device 20 makes it ideally suited for mounting on the forward-facing surface 24 of the keyboard 18, which typically has a small surface area relative to the keyboard upward-facing surface 22. The pressure-actuated pointing device 20 is recessed into the forward-facing surface 24 of the keyboard 18, thereby protecting the pressure-actuated pointing device 20 from being inadvertently struck when transporting the computer 10.

Referring to FIG. 3, the pressure-actuated pointing device 20 principally comprises a flexible stem 28 which rigidly mounts to and centrally supports a rigid finger pad 30. As seen in FIG. 2, the finger pad 30 has generally a disc shape with a reference point 36 positioned at the center of the finger pad 30. The finger pad 30 has a diameter sufficiently large to give an adult thumb enough degree of control when manipulating the PAPD 20. In a preferred embodiment, the finger pad diameter is about 3 centimeters (cm) and the finger pad comprises a hard plastic, such as, for example, Polyvinylchloride.

As illustrated in FIG. 3, the finger pad has a single planar rear surface 38 and a truncated hemispherical-shaped convex forward surface 39. The ergonomic design of the finger pad 30 permits the system operator to tactilely locate the center of the finger pad (i.e., the reference point 34) and thereby determine the location on the finger pad 30 at which to apply pressure in order to displace the cursor 16 in the desired direction on the graphics screen 14. In addition, the finger pad 30 moves in proportion to the amount of pressure applied to it, providing the system operator with tactile feedback regarding the level of pressure being applied to the finger pad 30.

Figure 7:
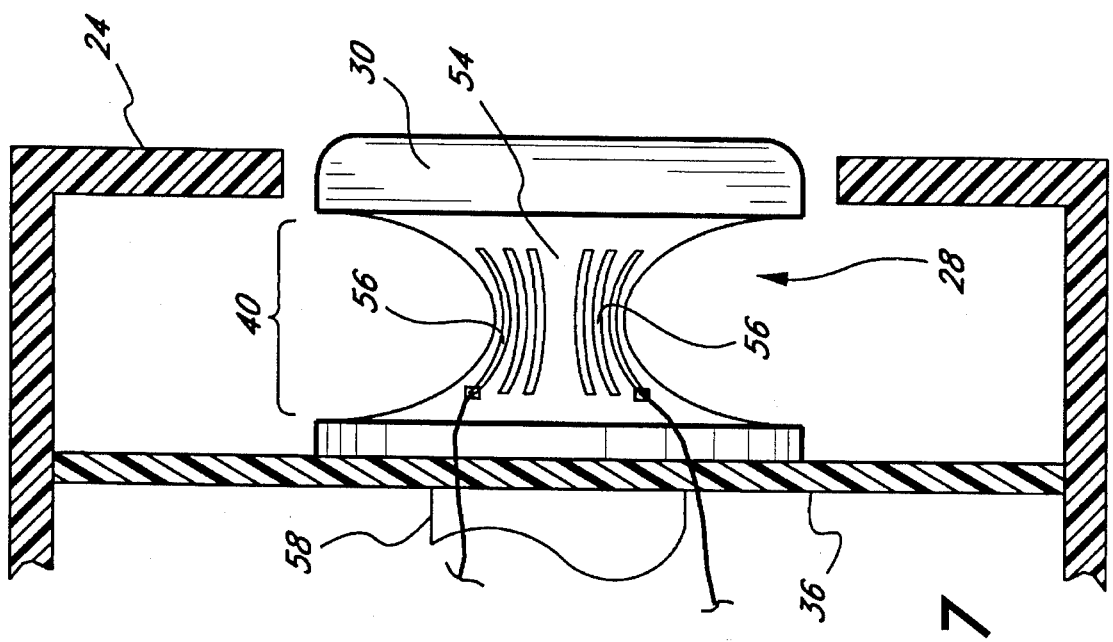
FIG. 7 is a cross-sectional view, also taken along line 3—3 of FIG. 2, illustrating another preferred embodiment of a pressure sensing device with strain-sensing transducers.

The stem 28 comprises a short, elastic, hollow rod 29 that deforms when a bending moment is applied to its end attached to the finger pad 30. The stem 28 also includes two flat disks 31 positioned at either end of the rod 29, thus giving the stem 28 a spool-like shape. Alternatively, the stem 28 has generally a circular hyperboloid shape as orthographically represented by FIG. 7. That is, the stem 28 of FIG. 7 has a shape increasing from its center towards each extremity in an exponential fashion (i.e., horn-like shaped). The former stem 28 configuration of FIG. 3 is preferably used with Hall effect pressure sensors and the latter stem 28 configuration of FIG. 7 is preferably use with strain gauge pressure sensors, as is discussed in detail below. The diameter of the stem 28 equals about 1.0 cm in the first embodiment of FIG. 3 and has a minimal diameter equal to about 1.0 cm in the second embodiment of FIG. 7 which increases to about 2.5 cm approximate to the ends of the stem 28.

The stem 28 is rigidly mounted to a base plate 36 which is at least coextensive with the rear surface 38 of the finger pad 30 and is parallel to the rear surface 38 with the finger pad 30 in its neutral position (i.e., the position of the finger pad 30 when no pressure is applied to the PAPD 20).

Figure 4:
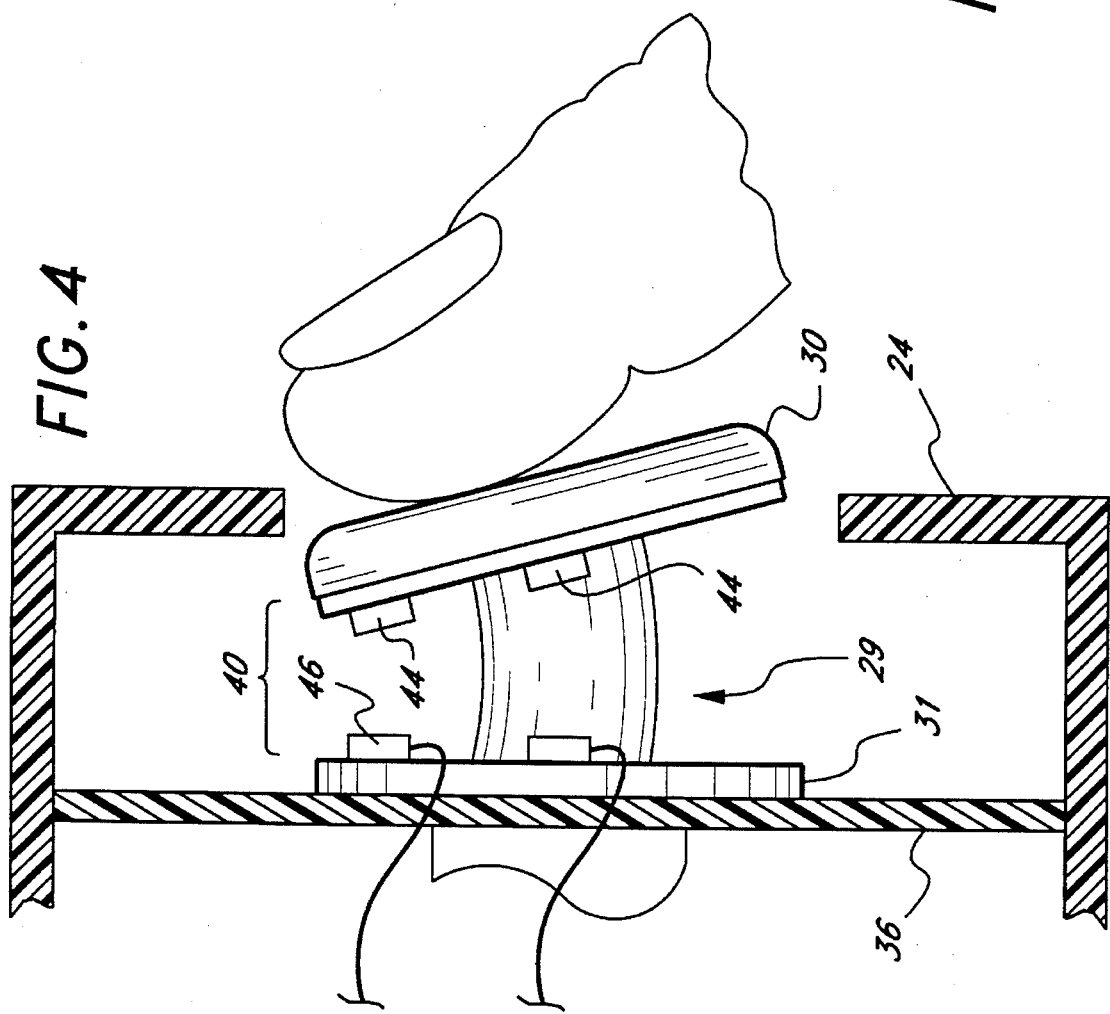
FIG. 4 is a partial cross-sectional view schematically illustrating the actuation of the pressure actuated pointing device of FIG. 3.

FIG. 4 schematically illustrates the basic actuation of the PAPD 20. In order to control the displacement of a cursor 16 on the graphics screen 14, a system operator presses on the finger pad 20 with a finger or a thumb. This tilts the finger pad 30 from its neutral position to an active position. When pressure is applied to the finger pad 30, a bending moment is created and the stem 28 deforms, thereby producing strain in the stem 28 and tilting the finger pad 30 with respect to the base plate 36. A pressure-sensor 40 resolves the level of pressure applied to the finger pad 30 and generates an output signal proportional to the applied pressure. The output signal controls the magnitude of the displacement of the cursor 16 on the graphics screen 14. The pressure-sensor 40 also detects the direction in which the user is deflecting the finger pad 30 by generating an output signal corresponding to a vector defined from the reference point 34 to the location on the finger pad 30 where the user is applying pressure (i.e., a pressure application point). The output signal controls the direction of the displacement of the cursor 16 on the graphics screen 14.

Alternatively, it is contemplated that the PAPD 20 could comprise two finger pads 30: one for controlling the magnitude of cursor displacement and the other for controlling the direction of cursor displacement.

The output signals related to magnitude and direction are preferably compatible with conventional types of input devices (e.g., mice), enabling the PAPD 20 be used with any application that supports the use of one of these conventional devices.

FIG. 3 illustrates a pressure-sensor 40 comprising a plurality of proximity-sensing devices (i.e., Hall Effect transducers). Each proximity-sensing device comprises a small magnet 44 located on a rear surface 43 of the stem disk 31 near the finger pad circumference and a magnetic transducer 46 correspondingly located on the forwardly-facing surface 48 of the disk 31 which functions as a datum surface. As best illustrated in FIG. 5, the proximity-sensing device magnets 44 are separated by an angle of about 90° about the circumference of the disk 31. Each transducer 46 senses the distance between the rear surface 43 of the stem 28 and the forward surface 48 of the stem 28. In the neutral position, the distance between the stem rear surface 43 and the forward surface 48 of the stem 28 is uniform, and in a preferred embodiment equals about 1.0 cm. When the system operator applies pressure to the finger pad 30, the finger pad 30 tilts to an active position, thereby skewing the stem rear surface 43 with respect to the stem forward surface 48. Consequently, the magnetic transducers 46 sense the distance variations between the corresponding magnets 44 mounted on the rear surface 43.

Figure 6:
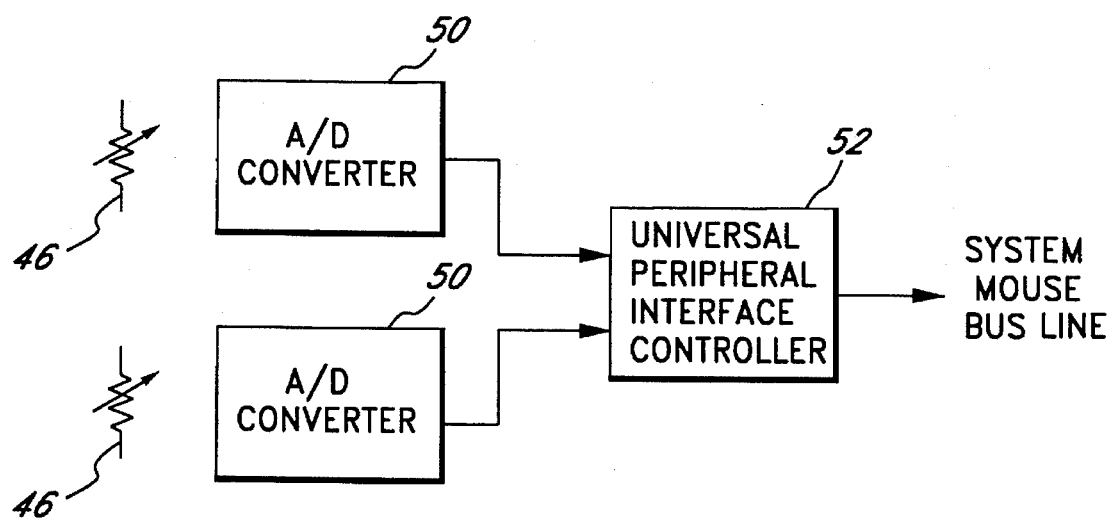
FIG. 6 is a schematic block diagram illustrating an electronic system interfacing the pressure actuated pointing device with a mouse driver controlling a graphic screen cursor of the personal computer of FIG. 1.

FIG. 6 schematically illustrates a signal processing system employed with the PAPD 20. Analog-to-digital (A/D) converters 50 convert the analog voltage outputs of the magnetic transducers 46 into digital signals. A universal peripheral interface controller 52, such as, for example, the Intel 8742 chip, processes the digital signal and converts the signal into information regarding the level and location of the pressure applied by the system operator to the finger pad 30.

The universal peripheral interface controller 52 preferably includes a central processing unit, RAM and ROM memory, input-output lines and a data bus to interface to the host system of central processing unit 12. The universal peripheral interface controller 52 interprets the incoming data from the analog-to-digital converters 50 and produces a pulse train which is sent to the host computer processing unit 12 via conventional bus lines used for a mouse peripheral unit. A program running in the universal peripheral interface controller 52 generates the pulse train by performing the following steps. The program samples the input lines of the universal peripheral interface controller 52 connected to the output of the analog-to-digital converters 50 at regular intervals and evaluates the force and/or displacement variations sensed by the pressure sensors 40. The program also computes the corresponding movement which must be communicated to the graphic cursor 16 and generates a corresponding pulse train that reflects such cursor movement changes. A mouse driver, in communication with the universal peripheral interface controller 52, picks up the pulse train to control the cursor movement, as known in the art.

FIG. 7 illustrates an alternative pressure-sensor 40 comprising a strain-sensing device 54. The strain-sensing device 54 comprises an arrangement of four strain gauges 56 attached to the stem 28 at 90 degree intervals. The strain gauges 56 comprises a piezoelectric material printed onto the stem 28, as known in the art. Each strain gauge 56 senses the amount of strain produced along a particular axial section of the stem 28 due to the applied bending moment. The output signals of the strain gauges 56 are processed by the computer and converted into information regarding the level and location of pressure applied by the system operator to the finger pad to control the cursor movement as explained above. In a preferred embodiment, the stem 28 has a length (i.e., the distance between the stem rear surface 43 and the base plate 36) equal to about 1.5 cm.

Figure 8A:
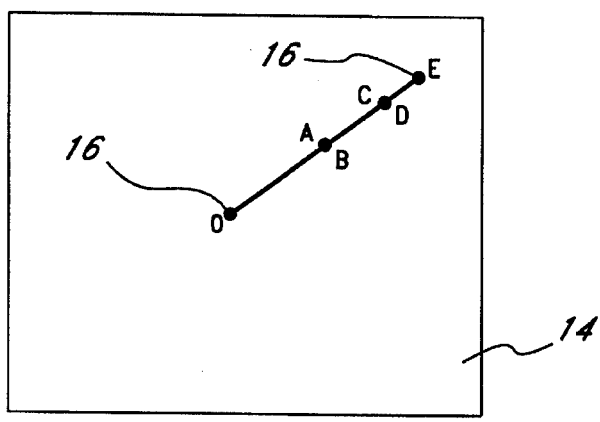
FIGS. 8a, 8b and 8c illustrate the relationship between the pressure applied to the pressure actuated pointing device and the displacement of the graphic screen cursor.
Figure 8B:
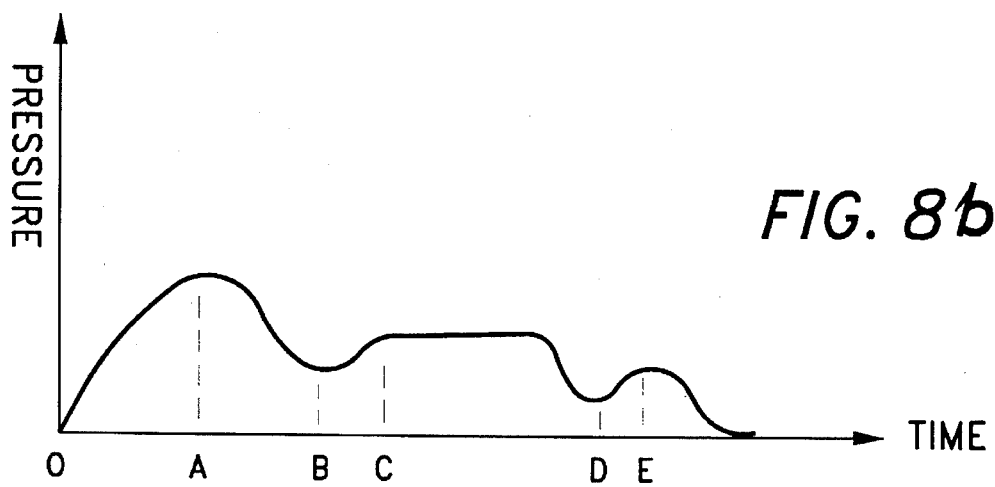
Figure 8C:
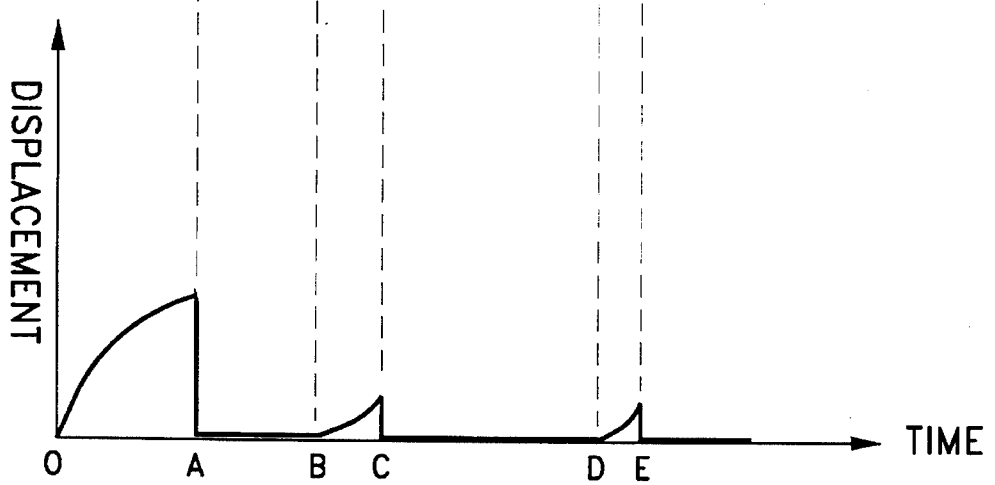

FIGS. 8a, 8b and 8c illustrate the relationship between the pressure applied on the finger pad 30 and the displacement of the cursor 16 on the graphics screen 14. The magnitude of the displacement of the cursor 16 on the graphics screen 14 is directly proportional to the positive gradient of the pressure applied to the finger pad 30. Because the magnitude of the displacement of the cursor 16 as a function of time is directly proportional to the cursor's speed, the speed of the cursor 16 on the graphics screen is also directly proportional to the positive gradient of the pressure applied to the finger pad 30. Consequently, the cursor 16 will be displaced on the graphics screen 14 in direct proportion to the increasing amount of pressure applied to the finger pad 30. Advantageously, once the applied pressure remains constant or decreases, the cursor 16 ceases movement.

Thus, referring to FIGS. 8a, 8b and 8c, as the system operator depresses the finger pad 30 as illustrated by the curve between point 0 and point A, the cursor 16 is displaced by an amount corresponding to the amount of positive pressure applied. Likewise the positive pressure gradients represented by the curves between points B and C and between points D and E produce a corresponding displacement of the cursor 16 on the graphic screen 14. The cursor 16 does not move during periods of constant or decreasing pressure, as represented by the curves between points A and B and between points C and D, and by the curve extending from point E.

FIGS. 8a, 8b and 8c illustrate that the amount of displacement of the cursor 16 on the graphic screen 14 directly corresponds to the positive pressure gradient. Thus, where the system operator applied more pressure between points O and A than between points B and C, the cursor 16 moved on the graphics screen 14 by a greater amount between points O and A than between points B and C.

This relationship between the applied pressure and the cursor displacement prevents the system operator from "over-shooting" a desired target, thus permitting the system operator to displace the cursor 16 quickly and accurately with a minimum of skill and effort. The system operator applies an increasing pressure to the PAPD 20 until the cursor moves close to the target and suddenly stops the cursor at or near the target by applying a constant pressure or by releasing the pressure on the PAPD 20. When near the target, the system operator can home in on the target by applying small increments of positive pressure.

The range of pressure permitted by the PAPD 20 is great enough to allow the system operator to displace the cursor 16 diagonally from one corner of the graphics screen 14 to the opposite corner in one continuous cursor motion. Furthermore, the pressure sensitivity of the PAPD 20 is adjustable through a configuration program, thereby allowing the system operator to customize the "feel" of the PAPD 20.

Referring to FIG. 3, the PAPD 20 preferably includes a selection button 58, such as, for example, a conventional bi-polar switch, positioned at the center of the PAPD 20. The selection button 58 communicates with the computer processing unit 12 and indicates to the processing unit 12 that the system operator has selected an object or an area on the graphics screen 14. When the system operator presses the center of the finger pad 30, the selection button 58 is actuated and the appropriate output signal is sent to the computer processing unit 12. This implementation of a selection capability is preferred because it does not require the user to move a finger to another location in order to select an object or an area on the graphics screen 14. Nonetheless, an alternate implementation of a selection capability is to place one or more selection buttons 58 proximate to the finger pad 30 of the PAPD 20. A further implementation of a selection capability is to employ a convenient combination of keyboard keys 26 to actuate the selection mechanism.

The few components of the PAPD 20 contribute to easy manufacture and assembly. Moreover, the PAPD 20 includes no movable mechanical transducers (e.g., rollers or trackballs) thus making the PAPD 20 ideally suited for use in "dirty environments." Few contaminants are likely to deposit on the internal workings of the PAPD 20 and deposited contaminants are not likely to significantly effect the performance of the PAPD pressure sensors 40. A clear pliable shield may also cover an aperture 68 (FIG. 2) in the forward-facing surface 24 opening into the PAPD 20 to shield the internal workings from external contaminants.

Figure 9:
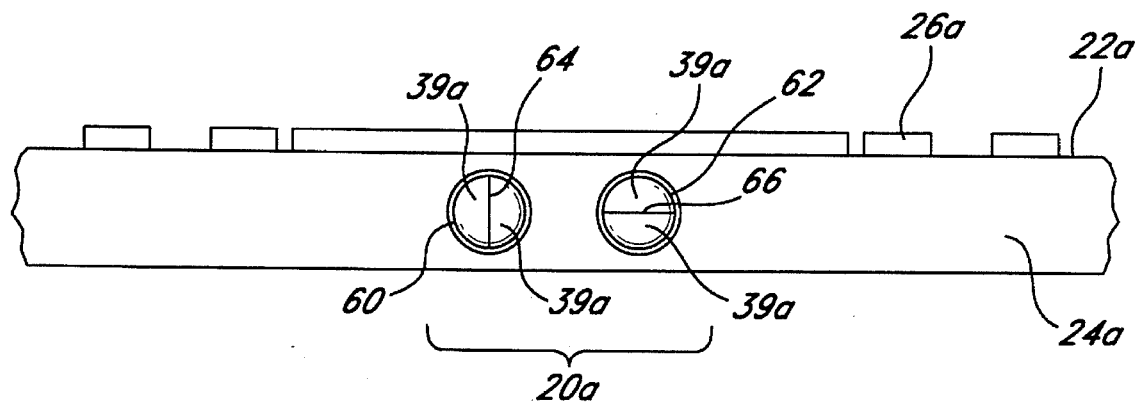
FIG. 9 is a partial front elevational view of another preferred embodiment of a pressure actuated pointing device of the present invention.

FIG. 9 illustrates a plan view of another preferred embodiment of a PAPD 20a. Where appropriate, like numbers with an "a" suffix have been used to indicate like parts of the two embodiments for ease of understanding. A left finger pad 60 and a right finger pad 62 are used in conjunction with each another to control the displacement of the cursor 16 on the graphics screen 14. The left finger pad 60 controls the cursor's horizontal displacement while the right finger pad 62 controls the cursor's vertical displacement. The left finger pad 60 is disc-shaped, has a single planar rear surface 38a, and has a diametrically-centered vertical ridge 64 at the intersection of its two planar forward surfaces 39a. The forward-facing surfaces 39a of the left finger pad 60 slope from the centered vertical ridge 64 toward the rearward-facing surface 38a and are symmetric about the centered vertical ridge 64. Similarly, the right finger pad 62 is disc-shaped, has a single planar rear surface 38a, and has a diametrically-centered horizontal ridge 66 at the intersection of its two planar forward surfaces 39a. The forward-facing surfaces 39a of the right finger pad 62 slope from the centered horizontal ridge 66 toward the rearward-facing surface 38a and are symmetric about the centered horizontal ridge 66. The ergonomic design of the finger pads 60, 62 permits the system operator to tactilely locate the centerline of each finger pad 60, 62 and thereby determine the location on the finger pad 60, 62 at which to apply pressure in order to displace the cursor 16 in the desired direction on the graphics screen 14. In addition, each finger pad 60, 62 moves in proportion to the amount of pressure applied to it, providing the system operator with tactile feedback regarding the level of pressure being applied to the finger pad 60, 62.

To move the cursor in a diagonal direction, the system operator applies pressure to both the left finger pad 60 and the right finger pad 62 simultaneously. For example, if the system operator desires the cursor to move in a direction along a clockwise 45° angle from the vertical, equal positive pressure gradients are applied to the right-hand side of the left finger pad 60 and to the upper side of the right finger pad 62. Alternatively, if the system operator desires to increase the vertical component of the vector along which the cursor moves (i.e., to move at a stepper angle from its starting point), a relatively lesser positive pressure gradient is applied to the right-hand side of the left finger pad 60 and a relatively greater positive pressure gradient is applied to the upper side of the right finger pad 62.

FIG. 9 illustrates the preferred embodiment for the mounting of the above-described embodiment of the PAPD. The left and right finger pads 60, 62 of the PAPD 20 are flexibly-mounted beneath a forward-facing surface 24a of the keyboard 18a, as described above in connection with the single finger pad embodiment. This ergonomic positioning of the PAPD's left and right finger pads 60, 62 takes advantage of the natural position of the system operator's thumbs, which are normally on or very near the keyboard's forward-facing surface 24a near the space bar 25 while using the computer 10.

Although this invention has been described in terms of certain preferred embodiments, other embodiments which will be apparent to those of ordinary skill in the art are also within the scope of this invention. For instance, another type of cursor control system having a finger-activated input mechanism, such as, for example, a trackball, a joystick, an isopoint or a like input mechanism, could be mounted on the forward facing surface of a keyboard to take advantage of the system operator's normal finger position when using the keyboard, as taught by the present invention. Accordingly, the scope of the invention is intended to be defined only by the claims which follow.

What is claimed is:

1. A finger-activated cursor control system for use with a graphics screen displaying a cursor, said control system comprising:

a finger pad;

a pressure-sensing means for resolving the level of pressure applied to paid finger pad and generating an output signal proportional to the applied pressure; and a controller receiving said output signal from said pressure-sensing means, said controller interpreting said output signal from said pressure-sensing means to control the magnitude of the displacement of said cursor on said graphics screen in proportion to only an increasing pressure applied to said finger pad as a function of time.

2. The cursor control systems of claim 1, wherein said cursor control system is used with a personal computer having a keyboard, said graphics screen displaying said cursor, and a processing unit, said personal computer being of the portable, laptop, or notebook variety.

3. The cursor control system of claim 2, wherein said personal computer comprises a forward-facing surface and said finger pad is integrally-mounted on said forward-facing surface.

4. The cursor control system of claim 3, wherein said finger pad is located proximate to a space bar of said keyboard such that a system operator can actuate said finger pad with a thumb without removing said operator's fingers form said keyboard's home keys.

5. The cursor control system of claim 1, wherein said pressure sensing means comprises a flexible stem supporting said finger pad and a strain-sensing device to measure the magnitude of the strain produced in said stem by applying pressure to said finger pad and thereby deforming said stem.

6. The cursor control system of claim 1, wherein said pressure-sensing means comprises a flexible stem supporting said finger pad, a datum surface, and a proximity-sensing device, said proximity-sensing device sensing the proximity of said finger pad to said datum surface.

7. The cursor control system of claim 1, wherein changes in the pressure applied to said finger pad result in said controller generating an output signal proportional to the changes in the applied pressure, said output signal producing discrete increments of displacement of said cursor on said graphics screen.

8. The cursor control system of claim 1, wherein changes in the pressure applied to said finger pad result in said controller generating an output signal proportional to the changes in the applied pressure, said output signal producing continuous displacement of said cursor on said graphics screen.

9. The cursor control system of claim 1, wherein said output signal generated by said controller is compatible with that provided by a conventional graphical input device.

10. The cursor control system of claim 1, wherein said pressure-sensing means detects a pressure application point and generating an output signal corresponding to a vector defined from a reference point to said pressure application point, said output signal controlling the direction of the displacement of said cursor on said graphics screen.

11. The cursor control system of claim 10, wherein said pressure-sensing means comprises a flexible stem supporting said finger pad and a strain-sensing device used to measure the magnitude of the strain produced in said stem by applying pressure to said finger pad and thereby deforming said stem, and wherein said strain-sensing device detects the location of the maximum or minimum strain in said stem.

12. The cursor control system of claim 10, wherein said pressure-sensing means comprises a flexible stem supporting said finger pad, a datum surface, and a proximity-sensing device, said proximity-sensing device sensing the proximity of said finger pad to said datum surface and also detecting the location at which the distance between the finger pad and the datum surface is at a maximum or minimum.

13. The cursor control system of claim 1, wherein the pressure sensitivity of said pressure-sensing means is adjustable.

14. The cursor control system of claim 1, wherein a selection capability is incorporated into said finger pad.

15. The cursor control system of claim 14, wherein the application of pressure at the center of said finger pad activates said selection capability.

16. A personal computer comprising:
   a graphics screen displaying a cursor;
   a keyboard that includes:
      an upward-facing surface supporting a plurality of conventional keys; and
      a forward-facing surface;
   a cursor control system having a finger-activated input mechanism mounted on said forward-facing surface of said keyboard and a controller connected to said input mechanism, said controller governing the displacement of the cursor on the screen display only in response to positive change in force applied to said finger-activated input mechanism as a function of time.

17. The personal computer of claim 16, wherein said finger-activated input mechanism comprises a finger pad and a pressure-sensing means for generating an output signal to control said cursor.

18. The personal computer of claim 16, additionally comprising a processing unit.

19. A method of controlling the movement of a cursor on a graphics screen comprising the steps of:
   applying pressure to a finger pad;
   responding only to a positive change in pressure applied to said finger pad as a function of time;
   resolving the level of said positive change in pressure applied to said finger pad into a magnitude of displacement component;
   generating an output signal proportional to the applied said positive change in pressure; and
   controlling the magnitude of displacement of said cursor on said graphics screen with said output signal.

20. The method of claim 19, additionally comprising the steps of:
   resolving the level of said positive change in pressure applied to said finger pad into a directional component;
   generating an output signal proportional to the applied pressure; and
   controlling the direction of displacement of said cursor on said graphics screen with said output signal.

21. A finger-activated cursor control system for use with a graphics screen displaying a cursor, said control system comprising:
   a finger pad;
   a pressure sensor coupled to said finger pad, said pressure sensor resolving the level of pressure applied to said finger pad and generating a signal proportional to the applied pressure; and
   a controller electrically connected to said pressure sensor to receive said signal from said pressure sensor, said controller producing an output signal to control the magnitude of the displacement of said cursor on said graphics screen only in response to signals from said pressure sensor which correspond to positive changes in pressure applied to said finger pad as a function of time.

22. The cursor control system of claim 21 wherein said pressure sensor comprises a transducer.

* * * * *

UNITED STATES PATENT AND TRADEMARK OFFICE
CERTIFICATE OF CORRECTION

PATENT NO.  : 5,508,719
DATED       : April 16, 1996
INVENTOR(S) : Jean-Philip Gervais It is certified that error appears in the above-indentified patent and that said Letters Patent is hereby corrected as shown below:

In column 10, at line 7, change "to paid finger" to --to said finger --.

In column 11, at line 27, change "positive change" to --positive changes --.

Signed and Sealed this

Fifteenth Day of October, 1996

*Attest:*

BRUCE LEHMAN

*Attesting Officer*     Commissioner of Patents and Trademarks